Figure 20:
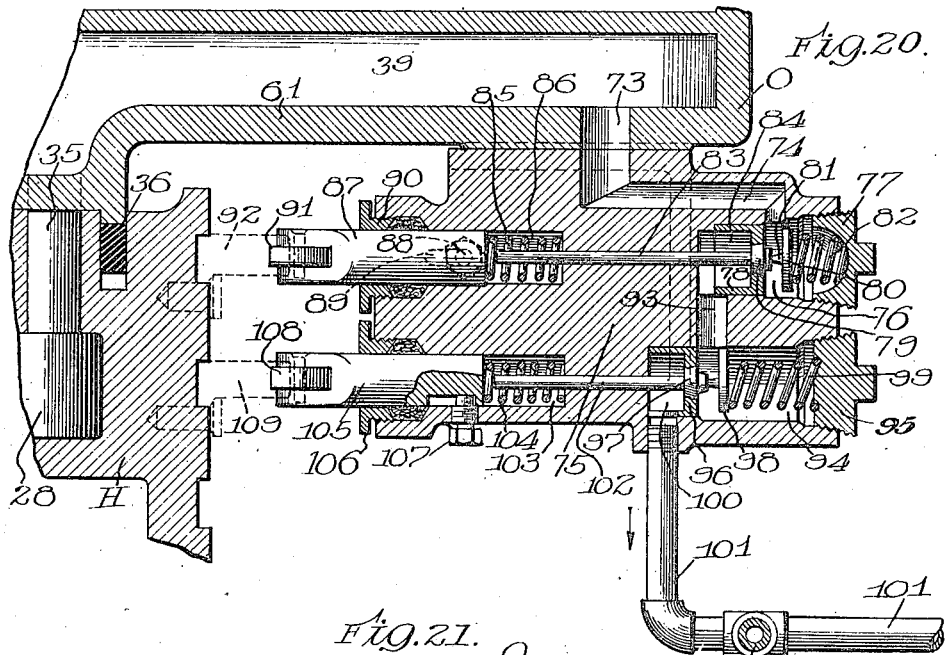

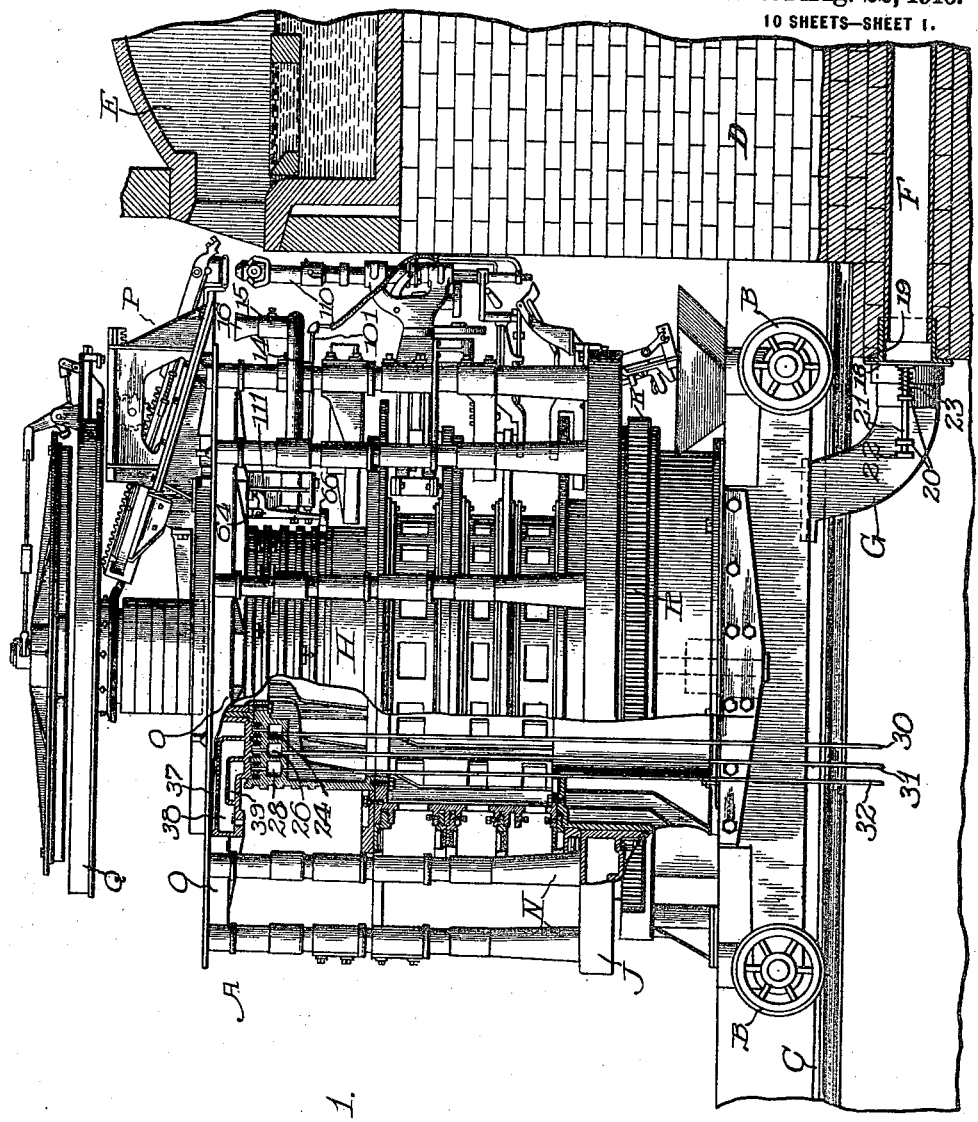

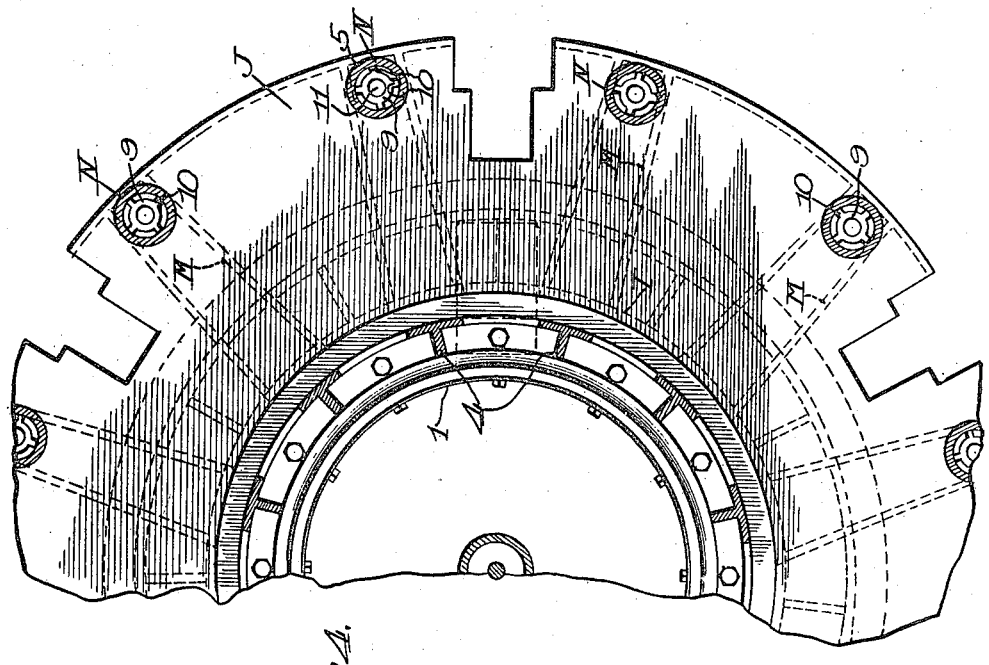
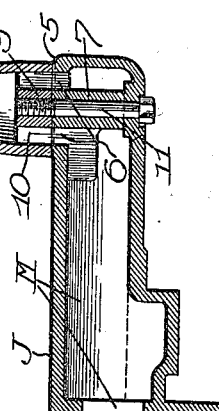
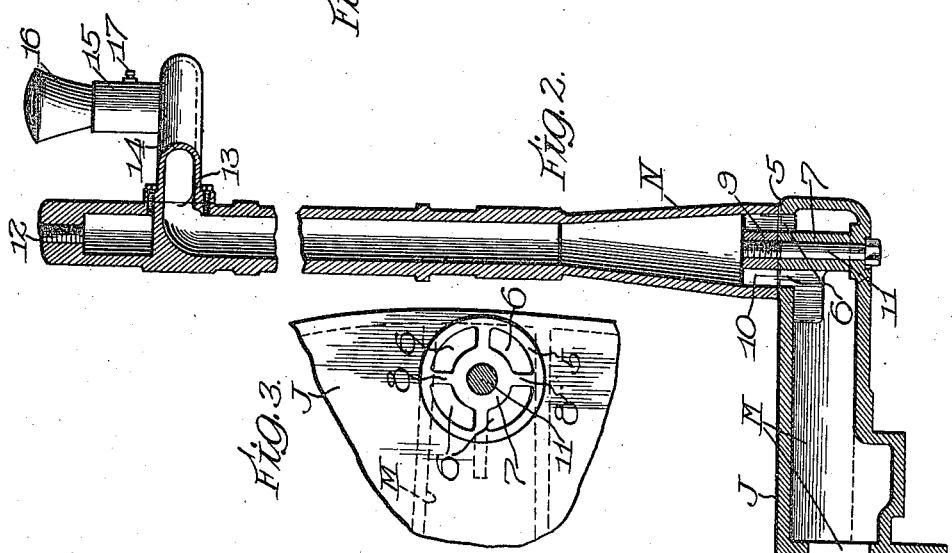
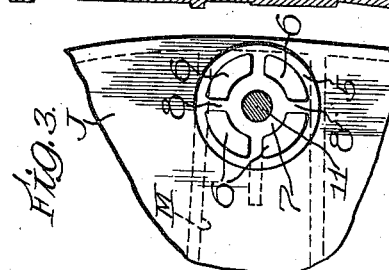

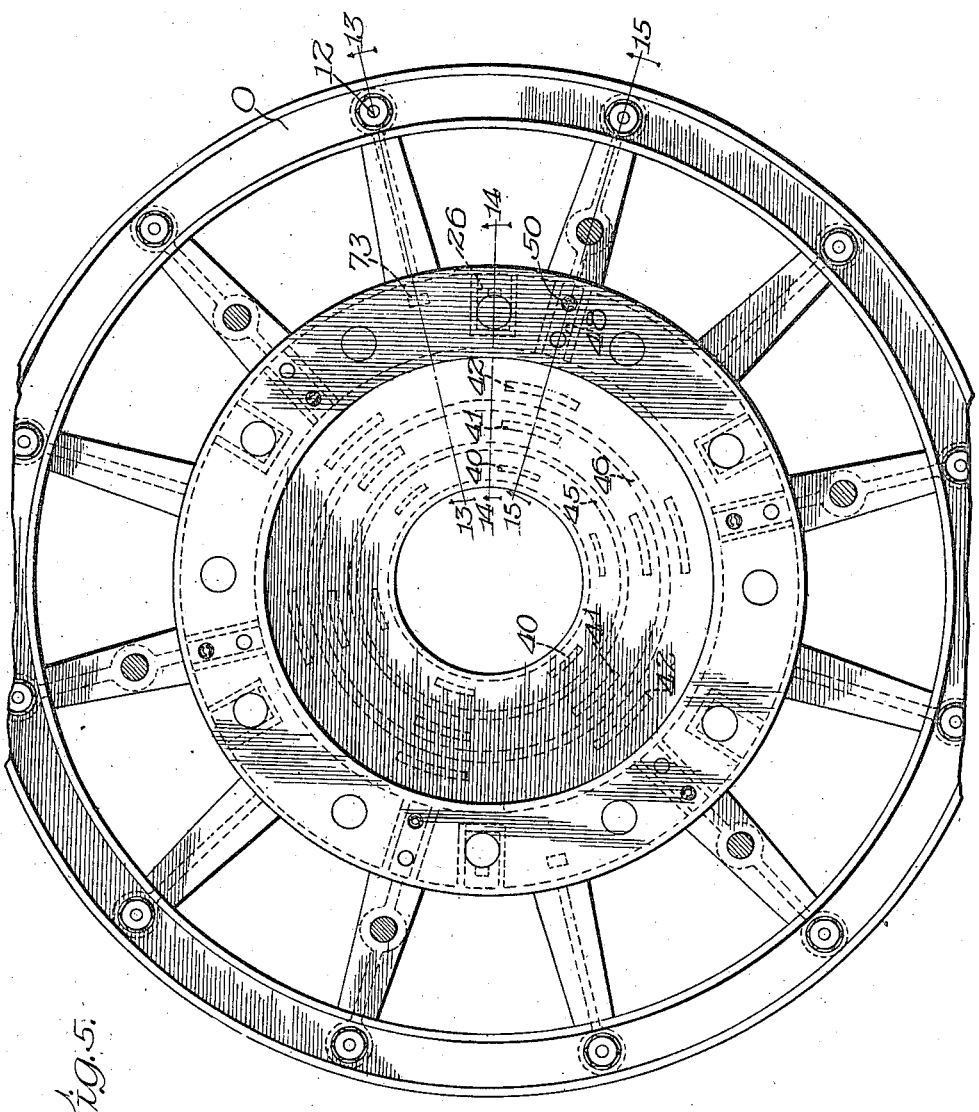

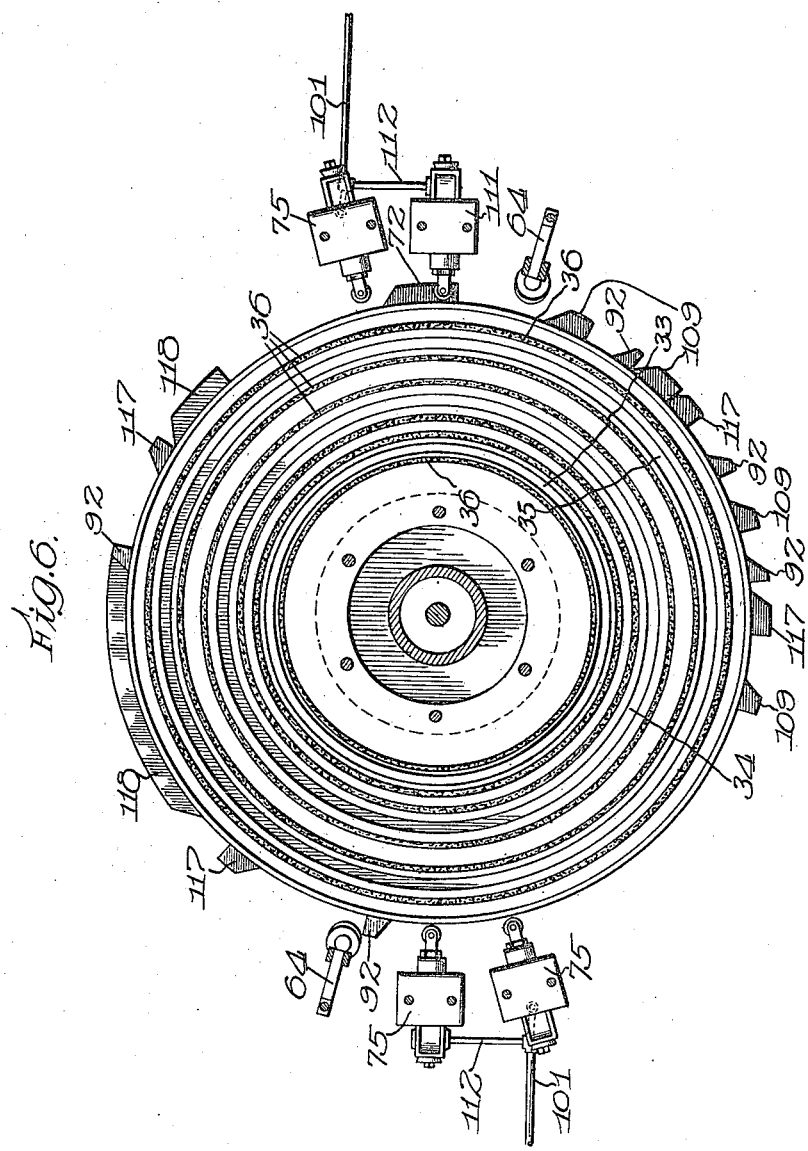

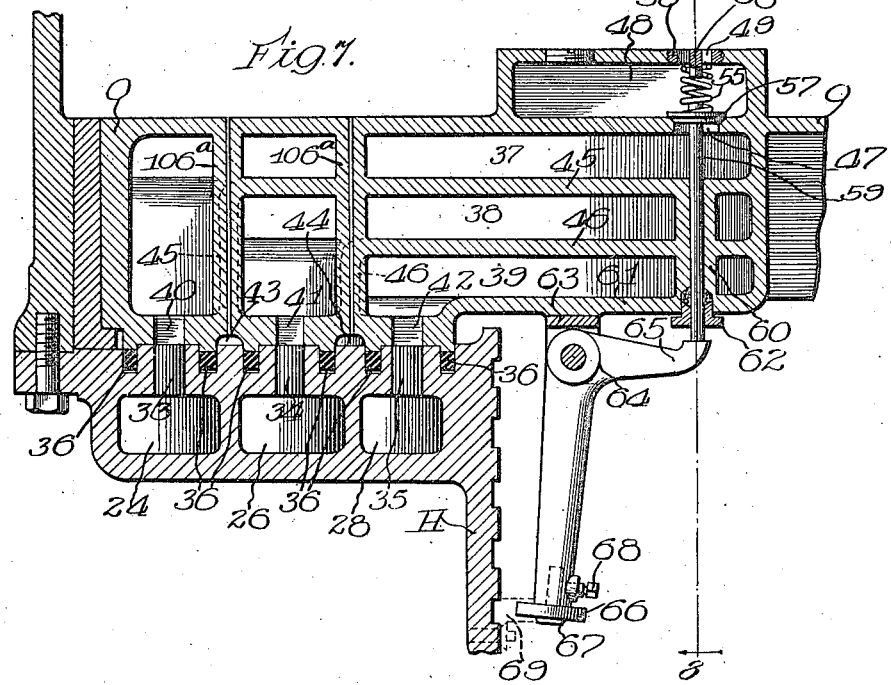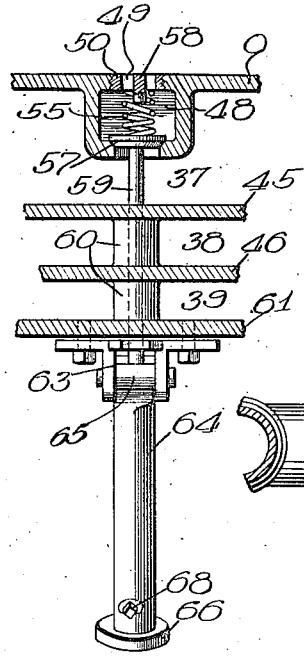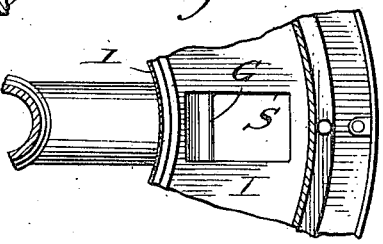

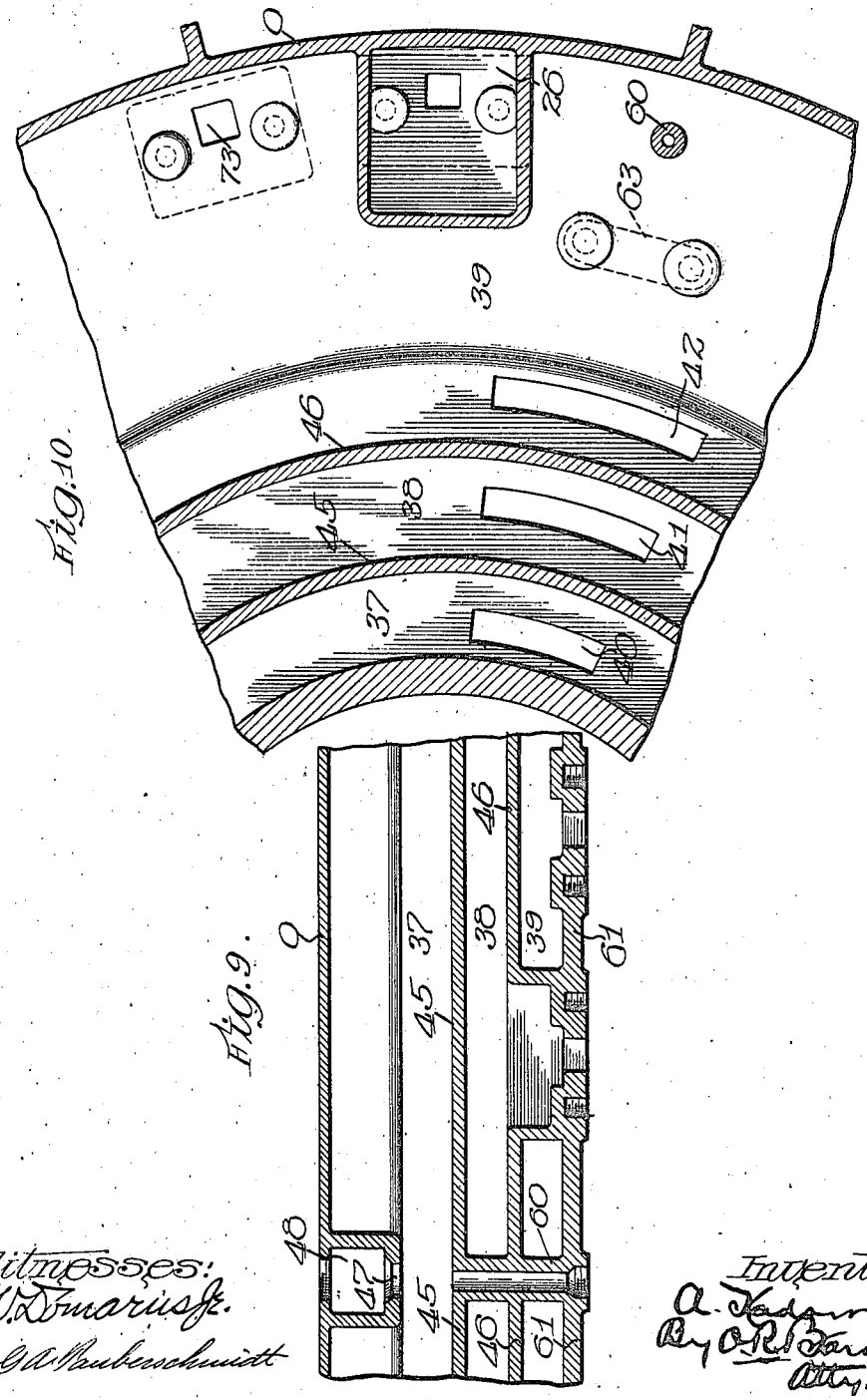

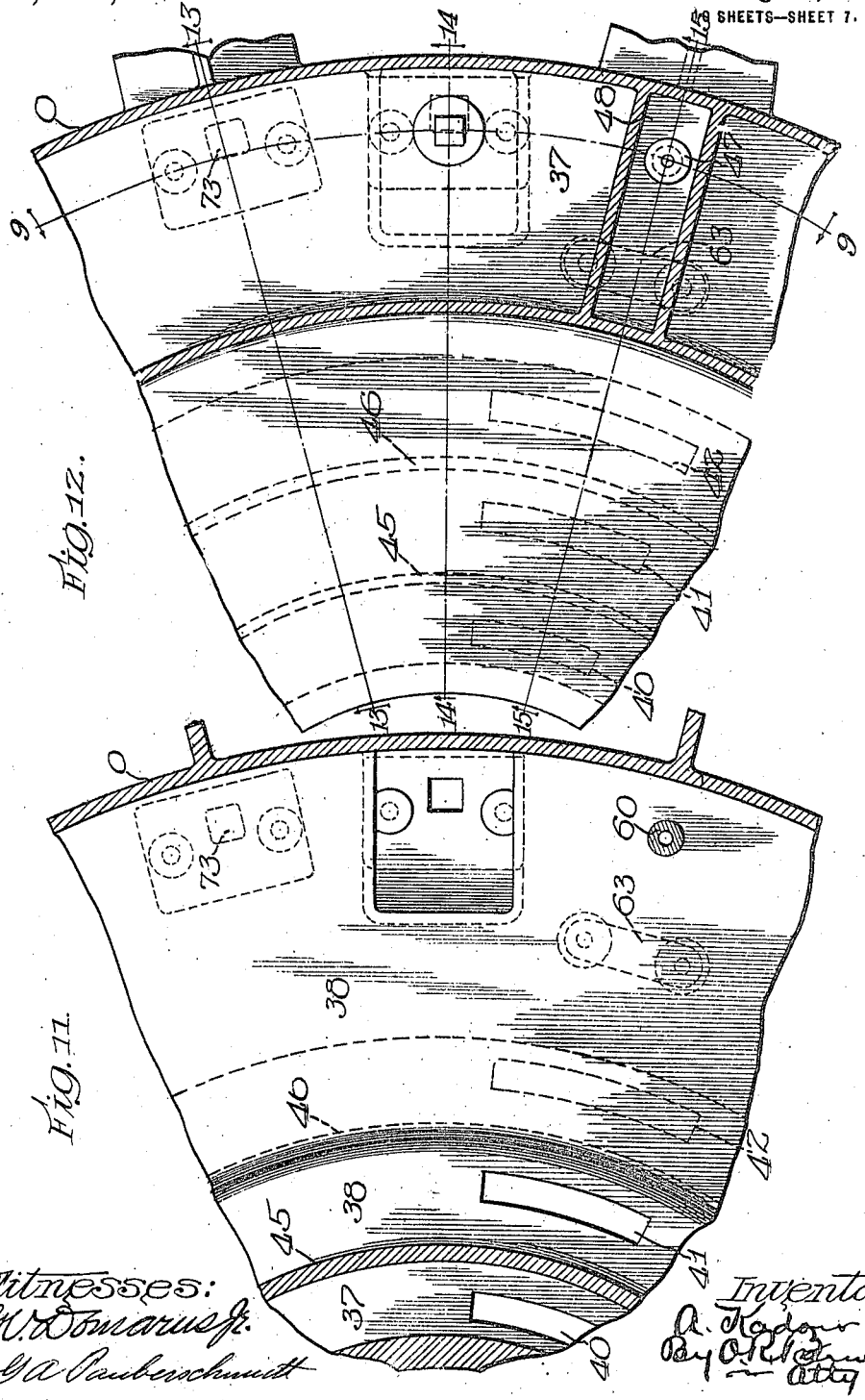

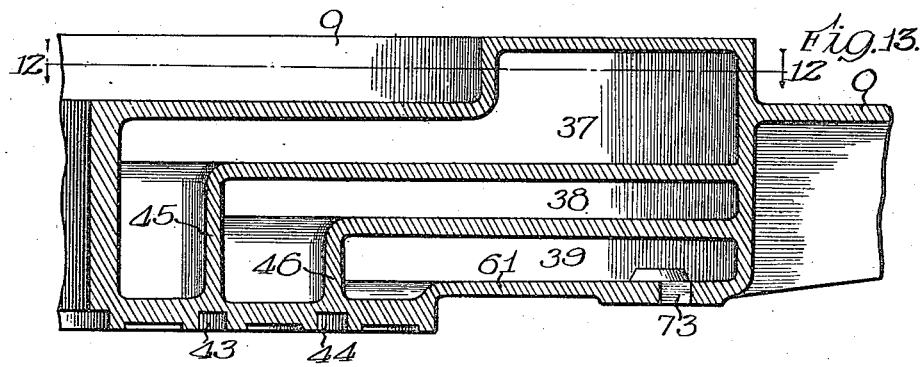
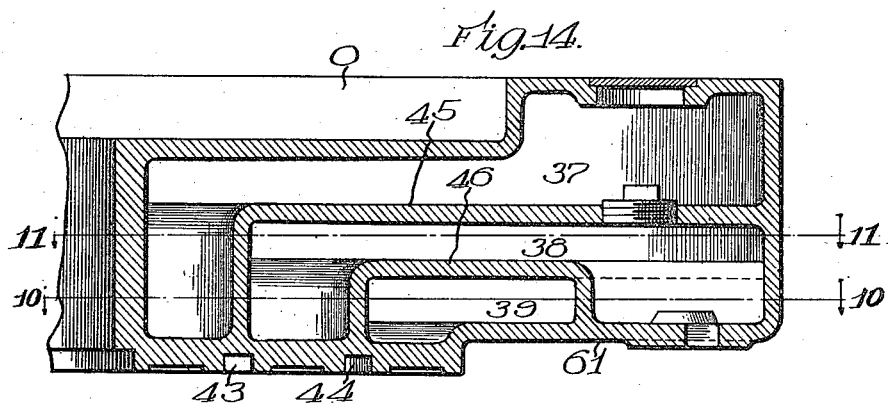
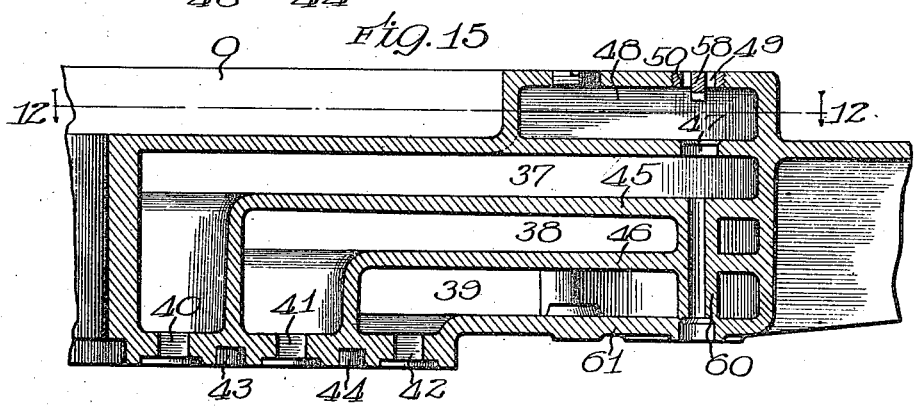

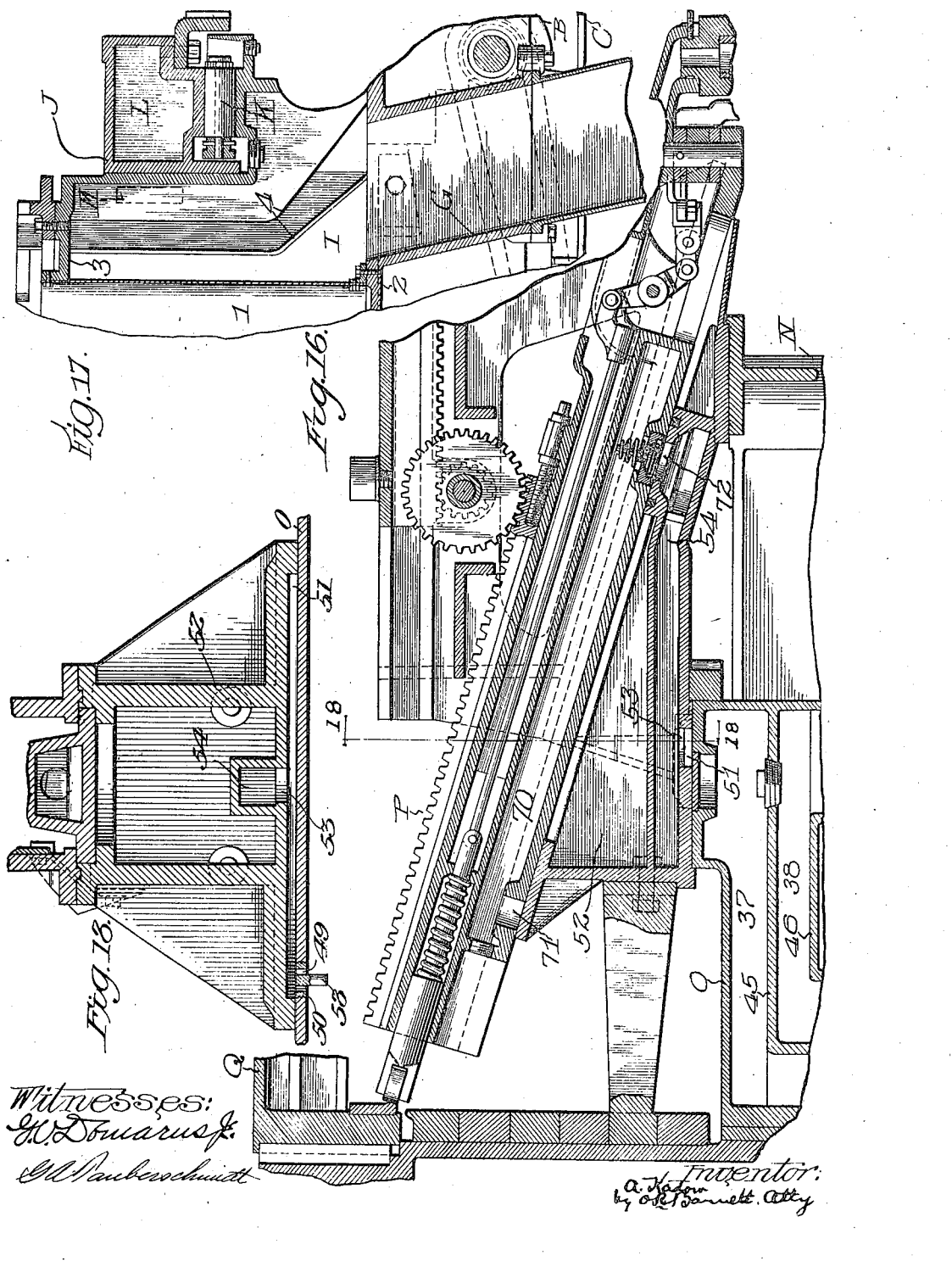

A. KADOW.
AIR CONTROL FOR AUTOMATIC MACHINERY.
APPLICATION FILED MAY 19, 1911. RENEWED AUG. 17, 1912.

1,195,588.

Patented Aug. 22, 1916.
10 SHEETS—SHEET 10.

Witnesses:
G. W. D'marus Jr.
G. A. Tauberschmidt

Inventor:
A. Kadow
By O. R. Barnett
atty

UNITED STATES PATENT OFFICE.

AUGUST KADOW, OF TOLEDO, OHIO, ASSIGNOR TO THE WESTLAKE MACHINE COMPANY, OF TOLEDO, OHIO, A CORPORATION OF OHIO.

AIR-CONTROL FOR AUTOMATIC MACHINERY.

1,195,588. Specification of Letters Patent. Patented Aug. 22, 1916.

Original application filed July 6, 1910, Serial No. 570,621. Divided and this application filed May 19, 1911, Serial No. 628,225. Renewed August 17, 1912. Serial No. 715,690.

*To all whom it may concern:*

Be it known that I, AUGUST KADOW, a citizen of the United States, residing at Toledo, in the county of Lucas and State of Ohio, have invented certain new and useful Improvements in Air-Control for Automatic Machinery, of which the following is a specification.

This application is a division of my application Serial No. 570,621, filed July 6, 1910.

My present invention relates to improvements in mechanism for controlling and utilizing air-bodies used in connection with the operations of machinery, especially automatic machinery.

The principal purpose of my present invention is to provide means for conveniently and automatically controlling air pressures which are utilized as a part of the working means of automatic machinery. In this connection I use the term "air pressures" as applicable to conditions varying from atmospheric pressure, either by way of pressures higher than atmospheric which are used in industrial operations in opposition to atmospheric pressure, and to pressures less than atmospheric which are manipulated so as to utilize the pressure of the atmosphere or other positive pressures to produce the operations desired.

More specifically, my present invention is especially adapted for use in glass-working machinery, and when my present invention is availed of in all respects hereinafter pointed out, it is especially adapted for use in automatic glass-working machinery in gathering the metal, delivering the blank cooling the gathering mechanism, expanding the blank, and supporting the blank against collapse. Nevertheless, my invention may be availed of not only to perform any one of these functions separately, but may also be availed of in other mechanisms, relating to the glass-working art or otherwise, wherein it is desirable in a similar manner to utilize a partial vacuum or to control or utilize the flow of air under pressure, and especially where it is desired to intermittently utilize definite quantities of air under a predetermined pressure. I therefore contemplate not only the application of my invention to glass-working machinery, but to all other situations where it is adaptable for use.

It is to be understood, therefore, that while in the accompanying drawings I have shown my invention in what I now consider to be its preferred form and applied to a complete machine for the automatic manufacture of electric light bulbs, the machine used for illustration being that of my said application No. 570,621, nevertheless such use of my present invention is merely by way of illustration to enable those skilled in the art to fully understand it, but such illustrated application of my invention is not to be understood as limiting its scope.

The above specified objects, and such other objects as may hereafter appear, may be attained by the convenient embodiment of my invention illustrated in the accompanying drawings, in which—

Figure 21:
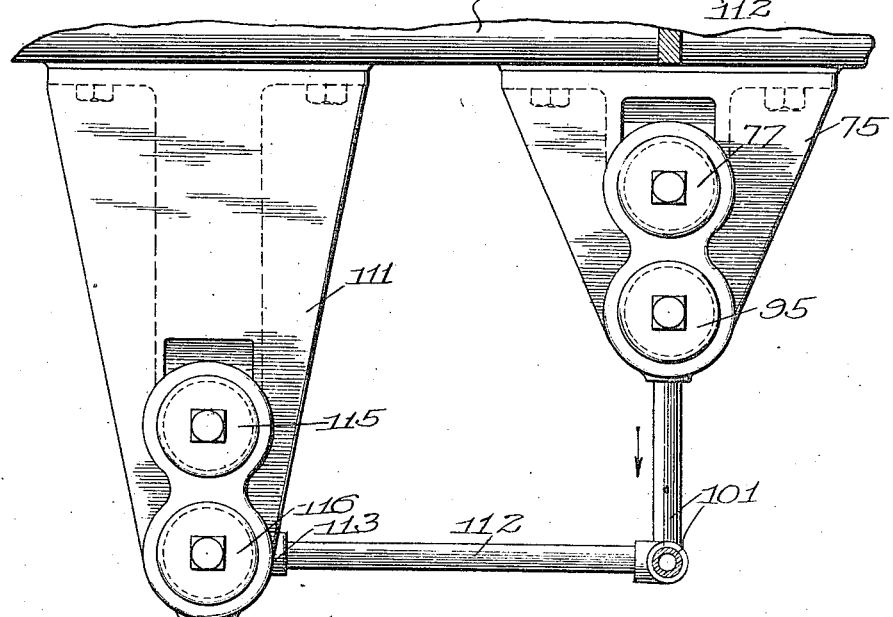

Figure 1 indicates a complete glass working machine embodying my invention. This view shows the machine in vertical elevation equipped with one working unit, with part of the machine broken away to show a vertical sectional view of certain parts of the mechanism. Fig. 2 is an enlarged vertical section through the bottom spider and one of the uprights or posts mounted thereon. Fig. 3 is an enlarged plan view of one of the pads on the bottom spider upon which one of the upright posts is mounted. Fig. 4 is a fragmentary plan view of the bottom spider, including a horizontal section through the central drum. Fig. 5 is a plan view of the top spider. Fig. 6 is a plan view of the air section of the central drum showing the various cams and cam-actuating valve mechanisms. Fig. 7 is a fragmentary enlarged sectional detail through the air cam section of the central drum and through the top spider, showing the various air chambers. Fig. 8 is a vertical sectional view on the line 8—8 of Fig. 7, looking in the direction indicated by the arrows. Fig. 9 is a vertical sectional view through the upper spider on the line 9—9 of Fig. 12, looking in the direction indicated by the arrows. Fig. 10 is a horizontal sectional view on the line 10—10 of Fig. 14, looking in the direction indicated by the arrows. Fig. 11 is a horizontal sectional view on the line 11—11 of Fig. 14, looking in the direction indicated by the arrows. Fig. 12 is a horizontal sectional view on the line 12—12 of Figs. 13 and 15, looking in the direction indicated by the arrows. Fig. 13 is a fragmentary vertical sectional view, on the line 13—13 of Figs. 5 and 12, looking in the direction indicated by the arrows. Fig. 14 is a like view on the line 14—14 of Figs. 5 and 12. Fig. 15 is a like view on the line 15—15 of Figs. 5 and 12, looking in the direction indicated by the arrows. Fig. 16 is a longitudinal sectional view through the center of the ram, ram-carriage and ram-housing, showing also a fragmentary sectional view of certain associated parts. Fig. 17 is an enlarged fragmentary sectional detail of one corner of the central drum and associated parts, showing the conduit leading thereto for supplying air to cool the gathering mechanism. Fig. 18 is a fragmentary transverse sectional view on the line 18—18 of Fig. 16, looking in the direction indicated by the arrows. Fig. 19 is a fragmentary horizontal sectional view through the main air chamber of the central drum and looking downwardly into the port which communicates with the air trunk (see Fig. 17). Fig. 20 is a sectional detail through the high pressure air valves and their actuating mechanism. Fig. 21 is a front elevation of the high pressure and low pressure air valve casings.

Like characters of reference indicate the same parts on the several figures of the drawings.

Referring to Fig. 1, A indicates as an entirety a complete machine mounted on the wheels B adapted to run on the tracks C toward and from the furnace D, containing the working chamber or glass-pot E. F is a stationary air conduit in the base of the furnace arranged to supply air for cooling purposes to the machine through the air trunk G, which automatically makes a sufficiently tight connection with the conduit F in the manner to be hereinafter described when the machine is brought to working position adjacent the furnace. The machine so outlined consists of a stationary central drum H, the lower section of which comprises an air chamber I in communication with the air trunk G (Figs. 17 and 19). At a higher point around the periphery of this central drum are secured a number of cams and cam-plates for actuating the working mechanism. Higher yet I preferably mount the air valve cams on the periphery of this drum, while the upper section of the drum is provided with three chambers which are preferably annular and concentric with each other. Rotatably mounted about this central drum is the bottom spider J which travels on anti-friction bearings, such as the rollers K (Fig. 17), and is provided with an air chamber L communicating with the air chamber I through ports M (Fig. 17). Mounted upon the bottom spider J are hollow uprights N upon the upper ends of which is mounted the top spider O.

For convenience and clearness of illustration, I have shown the machine as equipped with one complete glass-working unit, although the framework of the machine as shown is adapted and intended to be equipped with six such units. Each unit comprises glass-gathering mechanism P (Fig. 1). Q is a cam-plate which by suitable gearing constantly rotates and carries the cam which actuates the gathering mechanism P to enter the working chamber of the furnace to gather the desired quantity of metal, withdraw therefrom, and transfer the gather to the spindle 110 for blowing.

R is a peripheral gear on the bottom spider, by means of which the framework consisting of the bottom spider J, top spider O and uprights N is constantly rotated about the stationary central drum H.

This in a general way indicates the structure as an entirety of the particular machine shown.

The present invention, relating to the air-control, involves five general features, to wit: 1, the cooling air; 2, the vacuum control; 3, the high pressure air control; 4, the low pressure air control, and, as an incident to the high pressure and low pressure air control, is involved—5, the automatic air relief.

As the volume and pressure of cooling air does not require any exact control, it merely being essential that a flow of cool air shall be directed to the desired point, no nicety of fittings or valves is required in this connection. I therefore supply a body of air for this purpose, and which obviously can be utilized wherever definite flow or definite pressure is of no consequence, from the conduit F (Fig. 1) through which there is a constant flow of relatively cool air when the machine is in operation. From this conduit the air is conducted to the air chamber I in the lower section of the central column through the air trunk G and port S (Figs. 17 and 19). This chamber is formed by fitting a sheet-metal drum 1 within the lower section of the central column, said drum being secured at its lower end to the base-plate 2 and at its upper end to the flange 3, thereby providing an annular air-chamber into which project the strengthening ribs 4. The lower spider J is cored to form the air-chamber L which extends entirely around the interior of the lower spider and communicates by ports M with the main air-chamber I. These communicating ports M in the central column and in the lower spider, respectively, are preferably so staggered with relation to each other that the air chamber L in the spider J is in constant communication with the air-chamber I in the central column.

The lower spider is provided on its upper face with raised bosses or pads 5 (Fig. 3) upon which are seated the lower ends of the upright posts N. These posts are hollow and the pads 5 are formed with cored openings 6. Cast in the lower spider are bosses 7 from which webs 8 radiate between the openings 6. The bottoms of the uprights or posts N are formed with similar bosses 9 from which webs 10 radiate, providing therebetween openings which register with the openings 6. Each upright N is secured to the lower spider by a bolt 11 extending through one of the bosses 7 and screwed into the bosses 9 on the bottom of the upright or post N. Other bolts are passed through the top spider and screwed into threaded openings 12 in the top of each of the posts N (Fig. 2).

Each of the posts N is provided near its upper end on its outer face with a port 13 leading from its interior, and curved air-pipes 14 are clamped at their opposite ends to these openings and are provided with hollow upright extensions 15 into which perforated nozzles 16 are secured by set-screws 17.

In the particular utilization of this structure illustrated in the drawings the parts are so arranged that when the gathering device has delivered the blank, leaving it in a heated condition from its contact with the molten glass, as well as from its insertion in the furnace, it is brought to a position above these nozzles to be continuously cooled by a blast of air discharged therefrom until the gathering mechanism is again actuated to move into the furnace and gather another charge of metal.

Of course, the air for cooling can be taken from the structure at any convenient point and can be utilized wherever a current of cooling air is desired.

A convenient method of automatically connecting the air trunk G with the air conduit F is illustrated in the drawings, as follows: The air trunk G is fitted at its outer end with a flanged sleeve 18 which fits snugly over the air trunk or pipe G. The flanged face of this sleeve 18 is constructed to make a snug joint with the flanged plate or sleeve 19 which is fitted into the conduit F and the flange of which fits against the face of the furnace wall. The air trunk G is provided with perforated lugs 20 on its opposite sides. Fitted through each pair of lugs 20 is a rod 21 having one end provided with a collar or head 22 and the other end secured to the flange of the sleeve 18. Interposed between the flange of the sleeve 18 and the nearest of the lugs 20, is a spring 23, so arranged that when the machine is away from the furnace the springs 23 on each side of the air trunk G will hold the sleeve 18 in its outermost position, but when the machine is moved up to the furnace the flanged face of the sleeve 18 will be brought snugly against the flanged face of the plate or sleeve 19 and, as the machine is brought to its final position, the air pipe or trunk G will move forward or telescope within the sleeve 18, while the sleeve 18 is held stationary by its abutment against the plate or sleeve 19, and thereby the springs 23 are compressed and the flanged faces of the sleeves 18 and 19 are held snugly in contact with each other, the weight of the machine, of course, effectively holding the springs 23 under compression.

*Air for working the blank.*—The air cam section of the central column is formed or cored to provide three continuous annular air chambers (Figs. 6 to 12). The chamber 24 is the vacuum chamber, 26 is the low pressure air chamber, and 28 is the high pressure air chamber. As these chambers are in a stationary part of the structure, pipes 30, 31 and 32 (Fig. 1), to provide the required partial vacuum or air pressure, or the required air pressures, may be tapped into them at any convenient point. Each of these air chambers is provided with an annular outlet port 33, 34 and 35, respectively (Figs. 6 and 7). Parallel with each of these annular ports are annular packing grooves 36, filled with packing material, two of these grooves being arranged between each of the ports 33, 34 and 35 (Figs. 6 and 7).

The top spider O is provided with corresponding chambers, to wit, a vacuum chamber 37, a low pressure chamber 38, and a high pressure chamber 39, provided with segmental ports 40, 41 and 42 connecting, respectively, with ports 33, 34 and 35, so that each of these chambers in the rotating upper spider is kept in constant communication with the corresponding chamber in the stationary central column (Fig. 6).

The under face of the upper spider O is formed with downwardly extending annular projections which fit into the packing grooves 36, and with bearing faces which rest upon the upper bearing face or surface of the air cam section of the central column. In this way communication between adjacent chambers is effectively sealed.

At 43 and 44 the under surface of the upper spider O is formed with annular grooves and at some convenient point bosses are formed which extend one of them across chamber 37 and the other across chambers 37 and 38, and holes 106$^a$ are drilled leading from the top of the upper spider through these bosses and through the webs 45 and 46, respectively, into the annular grooves 43 and 44. This arrangement serves the double purpose of providing a convenient means for supplying oil to the bearing surfaces between the upper spider and the central column and of providing a vent so that in case of any leakage from either of the chambers 37, 38 or 39 past the packing rings in the grooves 36, such leakage will escape to the exterior of the machine and cannot serve to interfere with the desired pressures in the adjacent chambers. (See dotted lines Fig. 9.)

*The vacuum control.*—From the vacuum chamber 37 in the upper spider O a port 47 communicates with an auxiliary vacuum chamber 48 (Fig. 7), from which a port 49 through a nipple 50 communicates with the vacuum groove 51 in the bottom of the ram-carriage 52 and thence through a port 53 to the vacuum chamber 54 in the ram-carriage when the vacuum valve 57 is open (Figs. 16 and 18). This nipple 50 is provided with a stem 58 around which is seated a spring 55 which normally holds the vacuum valve 57 to its seat (Fig. 7). The valve 57 is provided with a stem 59 extending through the boss 60 which connects the webs 45, 46 and 61 of the upper spider. A packing nut 62 surrounds the stem 59 making a tight joint. Pivotally secured to the bracket 63 on the underside of the upper spider O is a bell-crank 64, the short arm of which, 65, engages the lower end of the valve stem 59. The lower end of the long arm of the bell-crank lever 64 carries a roller 66 rotating on a pin 67 which is locked in position by the screw 68. A cam 69 (indicated in dotted lines in Fig. 7), secured to the air section of the central column H, projects into the path of the roller 66 so that as the spiders rotate the engagement of the roller 66 with the cam 69 rocks the bell-crank lever 64, thereby lifting the valve-stem 59, opening the vacuum valve 57, thereupon exhausting air through the passages in the ram leading to the gathering or suction end of the gathering mechanism, and through the chamber 70 in the ram, the port 71 in the ram and 72 in the ram-carriage, the vacuum chamber 54 in the ram-carriage, the port 53 and vacuum groove 51 in the ram-carriage (Fig. 16) and the port 49 in the nipple 50 in the upper spider O. In the machine shown, this occurs only when the gathering end of the ram is dipped in the metal, in which position the port 71 in the ram and 72 in the ram-carriage are in register with each other. This arrangement results in drawing the required quantity of metal up into the gathering end of the ram.

The transverse vacuum groove 51 in the ram-carriage is so arranged that some part of it is always in register with the vacuum port 49 in the top spider.

As the travel of the machine causes the roller 66 on the bell-crank 64 to pass the cam 69, the spring 55 reseats the vacuum valve 57, thereby closing the port 47 leading from the auxiliary vacuum chamber to the main vacuum chamber of the upper spider.

Obviously, the period and frequency of the opening of communication from the vacuum chamber in the main spider may be varied as required and may be accomplished with other mechanisms. So, also, it is to be noted that having provided means for periodically opening communication with the vacuum chamber as required, various mechanisms can be devised for utilizing this operation, not only in connection with the precise glass-gathering mechanism shown, but with other glass-gathering mechanisms, and also with mechanisms designed for other purposes.

*The high pressure air.*—From the high pressure chamber 39 in the upper spider O (Fig. 20), a port 73 communicates with a passage 74 in a valve casing 75, which casing is secured to the underside of the web 61 of the upper spider O. The passage 74 leads to a valve chamber 76 which is closed by a plug 77 and is provided with a bushing 78 in which is provided an air port normally closed by the valve 79. To insure the accurate setting of this valve I provide a washer 80 having a conical point 81, which bears upon the center of the valve 79 and is under pressure of the spring 82. The stem 83 of the valve 79 extends through a chamber 84 and through the valve casing 75, and also through a spring 85 seated in a chamber 86 in the valve casing 75.

Mounted to reciprocate within the chamber 86 is a plunger 87 which is normally held out of contact with the valve stem 83 by the expansion of the spring 85. A pin 88 extending into a slot 89 in the plunger 87 holds the plunger 87 from being forced out of the chamber 86 by the expansion of the spring 85. The plunger 87 extends through a stuffing box 90 and is provided at its outer end with a roller 91. Projecting in the path of the roller 91, as the spiders rotate about the central column H, are various cams 92, one of which is shown in dotted lines in Fig. 24.

Leading from the chamber 84 to a valve chamber 94 is a passageway 93. The valve chamber 94 is provided with a plug 95, a nipple 96, a valve 97, a washer 98 and a spring 99, substantially or exactly the same as the corresponding parts in the valve chamber 76.

The chamber 100 in the nipple 96 communicates with a pipe 101 which leads to a hose communicating with an air pipe on the spindle, which will be hereafter described. The stem 102 of the valve 97 extends into a chamber 103 in the valve casing 75 through a spring 104. A plunger 105 is arranged to reciprocate within the chamber 103, extends through a stuffing box 106, is held in place by a pin 107 and is held normally out of contact with the valve stem 102 by the expansion of the spring 104. This plunger 105 is provided with a roller 108 arranged to engage cams 109 which extend in the path of the roller 108, said cams being secured to the air section of the central drum H.

The cams 92 and 109 may be arranged in such relation to each other that one of the cams 92 will contact with the roller 91 and pass out of contact with the roller 91, as the rotating framework travels around the central drum, just before one of the cams 109 contacts with the roller 108. When the parts are thus arranged, the result is that whenever a cam 92 contacts with the roller 91, the plunger 87 is driven sharply forward and thereby quickly opens the valve 79, with the result that high pressure air passes from the air chamber 39 to fill the chamber 84, passage 93, and the chamber 94. As the cam 92 then passes out of contact with the roller 91, the expansion of spring 85 will quickly move plunger 87 out of contact with valve stem 83, and the valve 79 will be sharply closed, leaving the chamber 84, passage 93, and chamber 94 filled with a definite volume of air under a definite predetermined pressure. Immediately thereafter one of the cams 109, contacting with the roller 108, operates to open the valve 97, and thereupon said definitely measured quantity of air under a predetermined pressure expands through the pipe 101 and communicating pipes and hose into the spindle where, as will be hereafter explained, it will be conducted to the blowing end of the spindle to expand any plastic blank which may be on the spindle at the time, thereby subjecting the blank to a definite puff of air under definite pressure. This operation is repeated whenever required. However, whenever a different operation is desired, the cams 92 and 109 will be so arranged that the valves 79 and 97 will be simultaneously opened by contacting with the cams 92 and 109 which have been adjusted to a position to bring about this result.

While the spindle 110, shown in the accompanying drawings, is the specific spindle of my said application, No. 570,621, its particular construction does not constitute any part of the present invention and it may be taken as here indicating typically any suitable blowing mechanism to which it may be desired to conduct air under pressure in either of the manners above indicated. To this end any suitable conduit can be used to provide communication between the air-control valves and the spindle.

*The low pressure air control.*—In using the terms "high pressure" and "low pressure," I do not wish to be understood as limiting myself to any arbitrary or definite pressures, but those terms are used in a relative sense to indicate a difference in pressures which are maintained in high pressure and low pressure chambers, respectively, which differences of pressure will vary to a large or small extent according to the requirements of the user and according to the purposes for which the machine may be used. In my own specific use of the machine, I use a high pressure, at a pressure of several pounds to the square inch, for the purpose of expanding the glass blank, and I use a low pressure of a few ounces for the purpose of supplementing the high pressure when it is desired to maintain in the cooling blank a pressure which shall be sufficient to prevent a collapse of the blank while it is still more or less plastic, but which shall not be sufficient to further expand the blank after the high pressure air has served its purpose.

The low pressure air chamber 37 in the upper spider O is cored or extended down at intervals through the high pressure chamber (Fig. 14), and is in communication with valves and chambers arranged in a valve casing 111 secured to the underside of the upper spider O (Fig. 21), said valves being arranged and actuated, if desired, exactly the same as the high pressure valves shown in Fig. 20, and communicating through branch pipes 112 with the air pipe 101 leading to the spindle.

The low pressure air valve casings and valves may be in structure and operation essentially the same as said high pressure valves and casings, except that from the chamber in the low pressure valve and casing, corresponding to the chamber 94 in the high pressure casing (Fig. 20), a port leads through a lug 113, with which lug the pipe 112 is connected and, further, in the low pressure casing a chamber corresponding to the chamber 100 in the high pressure casing opens directly to the atmosphere through a lug or nozzle 114, so that the upper valve indicated at 115 in Fig. 21 controls the flow of air from the low pressure chamber in the top spider O, and the lower valve, indicated at 116 in Fig. 21, opens a vent or outlet to the atmosphere from the pipes 101 and 112.

In applying my invention to the automatic blowing of glass, I maintain about ten (10) pounds pressure to the square inch in the high pressure, and about five (5) ounces pressure to the square inch in the low pressure chamber. This pressure can be maintained and varied, of course, as required by any familiar air compressing and pressure-regulating device.

It is my experience that I have obtained best results in glass blowing by this mechanism in admitting the high pressure air to the spindle or blow-pipe in puffs, either in measured quantities by causing the valves 79 and 97 to open and close successively, or directly by simultaneously opening and closing said valves, and in either event quickly causing the relief valve 116 to be opened immediately after each puff so as to relieve all pressure in the interior of the blank in a manner analogous to common practice in glass-blowing with the ordinary hand blowpipe. This method of manipulating the glass appears to produce a more even distribution of glass in the finished article. For example, when the spindle has received the blank from the gathering mechanism P and is in upright position, I admit successively several puffs of high pressure air to the spindle and thus to the interior of the blank, such air being immediately relieved after each puff through the opening of the relief valve, and the blank tending to sink down and flatten down upon itself into mushroom-like form after each puff. Thereupon, by suitable mechanism, the spindle can be swung to other positions and the blank further expanded and developed by the operation of the spindle and the timed supply of air under pressure to the spindle by adjustments and operation of my air-control mechanism as above indicated.

If, as is indicated in the machine of the accompanying drawings, the final expansion and formation of the blank is done in finishing molds, then before the blank loses its plasticity the cams of the machine here illustrated are arranged to open all of the air-valves, whereby the blank may be subjected to the maximum pressure which is used in the machine for that purpose. Then, just before the mold is opened and the blank released, I shut off the high pressure air and admit the low pressure air only, which low pressure air will be insufficient to now expand the blank when it is now no longer supported by the mold, but is sufficient to internally support the blank against collapse during the short period which elapses between the opening of the molds and the complete hardening of the blank or bulb, if it has not completely set before the molds have opened. Under these conditions the finishing mold opens and the bulb upon being exposed to the external atmosphere becomes finally set without collapsing, and before the spindle delivers the blank or bulb.

Referring to Fig. 6, 92 are, for example, cams for opening the first or upper high pressure valve. 109 are cams for opening the high pressure valve leading to the air-pipes communicating with the spindle. 117 are the cams for opening the relief valve 116 to the atmosphere, 69 is a cam for opening the vacuum valve, and 118 are the low pressure valve cams.

It must be understood that the particular arrangement of valve actuating cams, as shown, is not essential and is largely arbitrary, as the exact position of these cams on the periphery of the drum or column, and also with relation to each other, may be changed as conditions or requirements of use may require, the arrangement illustrated merely being one typical arrangement which I have found to be effective. Consequently these specific arrangements, as also the determination of whether, for example, the vacuum, the low pressure, and the high pressure, shall be used, or whether only one of these controlling devices shall be used, and the determination as to what variations there shall be between the high and low pressures when used, and as to whether or not the air control devices shall be actuated successively or simultaneously, are all matters of variation and expediency to meet different services without departing from my invention which contemplates all such variations and changes in its use. Likewise, as to the broad features of my invention, its is unimportant whether the relative travel between the valve supporting members and the cam-carrying members involves a rotation of one about the other, as illustrated in the drawings, one member being stationary, or whether the parts are reversed, or whether the supporting means are both moving but at differential speeds, or whether the travel is other than a rotative travel, or whether the member traveling at the relatively higher speed shall be the cam-bearing member,—are all matters of mechanical selection, none of which involve a departure from my invention; and this application contemplates covering all such variations, substitutions and equivalents, and it is my intention to here claim and patent both broadly and as to all sub-combinations and details whatever patentable subject-matter is herein disclosed and described, which is properly patentable in this divisional application, but I do not here claim anything here shown which is described either in said parent application, Serial No. 570,621, or in my other co-pending divisional applications, Nos. 620,555, 620,556, 622,244, or 628,226, the present application being limited to the various devices for controlling and utilizing the partial vacuum and the flow of air under pressure, as heretofore described, and to all proper combinations and sub-combinations with said particular control devices.

I claim:

1. The combination with a plurality of superposed horizontally movable air valves, of a valve actuating device, means for causing a relative movement between said valves and said valve actuating device, whereby said valves will be intermittently actuated as required, and means whereby the relation between said valves and said actuating device may be so adjusted that said valves will be actuated at will either simultaneously or successively as required.

2. The combination with a stationary member provided with a plurality of air chambers, of means for supplying air under pressure to said chambers at differential pressures, a traveling member provided with corresponding chambers in communication with the chambers in said first-named member, and means for isolating definite quantities of compressed air from said chambers in the traveling member and controlling their flow.

3. The combination with a stationary member provided with a plurality of air chambers, of means for supplying air under pressure to said chambers at differential pressures, a traveling member provided with corresponding chambers in communication with the chambers in said first-named member, and means for isolating definite quantities of compressed air from said chambers in the traveling member and controlling their flow, said means being actuated by the relative travel between said members.

4. The combination with a stationary member provided with a plurality of air chambers, of means for supplying air under pressure to said chambers at differential pressures, a traveling member provided with corresponding chambers in communication with the chambers in said first-named member, and means for isolating definite quantities of compressed air from said chambers in the traveling member and controlling their flow, said means being adapted to permit such escape from said chambers in the traveling member either successively or simultaneously as required.

5. The combination with a stationary member provided with a plurality of air chambers, each air-chamber having a continuous outlet port, of a traveling member provided with corresponding air chambers having respectively ports in register with said first-named ports, packing interposed between said ports, one of said members being provided with a groove or chamber arranged between said packings and with an escape port leading from said groove, substantially as specified.

6. The combination with a stationary member provided with a plurality of air-chambers, each chamber having an annular outlet port, said outlet ports being arranged concentrically, of a traveling member provided with corresponding chambers having ports in register with said first-named ports, respectively, concentric lines of packing interposed between the ports which are not in register with each other, one of said members being provided with a recess interposed between two lines of packing and with a passageway leading from said recess to a point of discharge.

7. The combination with a blow-pipe, of a stationary member provided with an air-chamber, a traveling member provided with an air-chamber in communication with the air-chamber in the stationary member, means for supplying air under pressure to said chambers, means for controlling the flow of compressed air from said chambers to the blow-pipe, and means for automatically opening communication between said blow-pipe and the atmosphere at any desired interval after communication between said chambers and the blow-pipe has been opened and closed.

8. The combination with a blow-pipe, of a source of supply of air under pressure, an air conduit leading from said source of supply to the blow-pipe, a pair of valves arranged to control the flow of air through said conduit, and means for automatically actuating said valves, said means being adjustable to actuate said valves simultaneously or successively as required.

9. The combination with a blow-pipe, of a source of supply of air under pressure, an air conduit leading from said source of supply to the blow-pipe, a pair of valves arranged to control the flow of air through said conduit, means for automatically actuating said valves, said means being adjustable to actuate said valves simultaneously or successively as required, a relief valve in communication with said blow-pipe, and means for automatically opening said relief valve at desired periods with reference to the operation of said first-named valves.

10. The combination with glass-gathering means and a glass-working blow-pipe, of a vacuum chamber in communication with the gathering means, means for transferring a gather from the gathering means to the blow pipe, a pressure chamber in communication with the blow-pipe, means for maintaining a partial vacuum in the vacuum chamber, means for automatically opening and closing communication between the vacuum chamber and the gathering means at predetermined intervals, means for maintaining pressure in the pressure chamber, means for automatically opening and closing communication between the pressure chamber and the blow-pipe at predetermined intervals, and means for thereafter opening and closing communication between the blow-pipe and the atmosphere.

11. The combination between a support provided with a vacuum chamber, of glass-gathering mechanism carried by and slidable radially on said support, of means for maintaining a partial vacuum in said chamber, and means for automatically opening and closing communication between said vacuum chamber and said gathering means at regular intervals.

12. The combination with a stationary member, of a traveling member provided with a pressure chamber, of glass-gathering mechanism carried by said traveling member, means for maintaining pressure in said chamber, means actuated by the travel between said members for automatically opening and closing communication between said pressure chamber and said glass-working mechanism at predetermined intervals, means for transferring a gather from the gathering means to the working mechanism and means for automatically thereafter opening communication between the glass-working mechanism and a zone of pressure lower than the maintained pressure in said pressure chamber.

13. In a machine of the class described, valve mechanism comprising the combination with a source of supply of air under pressure, of glass-blowing means, a valve casing interposed between said air-pressure supply and said glass-working means, and provided with a passageway in communication with the same, respectively, of two spaced valves interposed in said passageway, a spring arranged to hold each valve normally closed, a plunger for each valve mounted in said casing and normally out of contact with its valve, and means for automatically actuating said plungers to open said valves at predetermined intervals.

14. In a machine of the class described, the combination with glass-gathering mechanism, of a vacuum chamber, glass-blowing mechanism, means for transferring a gather from the glass gathering mechanism to the glass blowing mechanism, a pressure chamber, and means for successively opening and closing communication between said vacuum chamber and said gathering mechanism and opening and closing communication between said pressure chamber and said glass-blowing mechanism.

15. In a machine of the class described, the combination with relatively movable members, of glass-gathering mechanism carried by one of said members, a vacuum chamber in communication with the interior of said glass-gathering mechanism, glass-blowing means carried by one of said members, means for transferring a gather from the glass gathering mechanism to the glass blowing means, a pressure chamber in communication with said glass-blowing means, a relief valve controlling communication between said glass-blowing means and the zone of pressure lower than that in said pressure chamber, and means actuated by the relative movement between said members for successively opening and closing communication between said vacuum chamber and the glass-gathering mechanism, said pressure chamber and said glass-blowing mechanism, and said relief valve.

16. The combination with a glass furnace provided with an air trunk, of a glass working machine, means for adjusting the distance between the machine and the furnace, and means for supplying air under pressure to the machine through said air trunk, said means comprising a flanged plate fitted into said air trunk, an air pipe on the machine, a flanged sleeve telescopically mounted upon the free end of said air pipe, spring actuated devices whereby the flanged sleeve is normally forced outwardly with relation to said air pipe, all so arranged that when the machine is moved toward the furnace to working position the flanged sleeve on the air pipe will engage the flanged plate in the air trunk and will be telescoped upon the air pipe so as to compress said spring devices and provide a sufficiently tight joint between the air trunk and the air pipe, in which position the devices will be held by the weight of the machine.

17. In a machine of the character described, the combination with a blowing device, of a source of supply of compressed air at different pressures, valves to isolate measured quantities of said air from said sources of supply and control the admission thereof to the blowing device, and automatically operated mechanism for actuating said valves.

18. In a machine of the character described, the combination with a blowing device, of a plurality of sources of supply of compressed air at different pressures above atmospheric pressure, valves to isolate independent measured quantities of said air from each of said sources of supply and control the admission of said quantities separately to the blowing device, and automatically operated mechanism for actuating said valve.

AUGUST KADOW.

Witnesses:
W. F. DONOVAN,
R. A. BOTHWELL.